United States Patent
Ford et al.

(10) Patent No.: US 6,807,472 B2
(45) Date of Patent: Oct. 19, 2004

(54) CLOSED LOOP CONTROL OF SHIFTING CLUTCH ACTUATORS IN AN AUTOMATIC SPEED CHANGE TRANSMISSION

(75) Inventors: Greg E. Ford, Redford, MI (US); Peter M. Jacobsen, Oakland Township, MI (US); Harold L. Bowman, Lapeer, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/327,792

(22) Filed: Dec. 23, 2002

(65) Prior Publication Data

US 2004/0122577 A1 Jun. 24, 2004

(51) Int. Cl.$^7$ ............................................... B60K 41/22
(52) U.S. Cl. ......................................... 701/58; 477/78
(58) Field of Search ............................. 701/36, 51–53, 701/58, 60, 61–62, 67–68; 477/34–41, 52, 57, 58–59, 62–63, 70, 74, 77–79, 83, 86, 89, 156–158, 161–164, 166, 179, 180

(56) References Cited

U.S. PATENT DOCUMENTS

| | | | |
|---|---|---|---|
| 4,611,285 A | 9/1986 | Weisman, II | 364/424.1 |
| 4,776,233 A | 10/1988 | Kita et al. | 74/687 |
| 4,781,080 A | 11/1988 | Iwatsuki | 74/867 |
| 4,791,568 A | 12/1988 | Hiramatsu et al. | 364/424.1 |
| 4,919,012 A * | 4/1990 | Bolz | 477/131 |
| 4,956,776 A | 9/1990 | Carre | 364/424.1 |
| 5,024,638 A * | 6/1991 | Sakakibara et al. | 475/210 |
| 5,062,050 A | 10/1991 | Petzold et al. | 364/424.1 |
| 5,899,829 A | 5/1999 | Salecker et al. | 477/78 |

* cited by examiner

*Primary Examiner*—Thu V. Nguyen
(74) *Attorney, Agent, or Firm*—Roger A. Johnston

(57) ABSTRACT

A method of controlling hydraulic shift clutch actuators in an automatic speed change power transmission of the type having an electronic controller (TCU) for energizing a solenoid operated valve to control each hydraulic clutch actuator. A pressure sensor is disposed to sense the hydraulic pressure ($P_s$) to each clutch actuator and provides an electrical signal to the TCU which also receives a clutch pressure command signal ($P_c$) from the vehicle powertrain computer. The TCU computes the differential $\Delta P = P_c - P_s$ and determines the valve energization current $I_E$ from known relationships between $\Delta P$ and the percentage of maximum valve current and repeats the process in real time to adjust $I_E$ until $\Delta P$ is negligible.

11 Claims, 4 Drawing Sheets

CLOSED LOOP CONTROL OF SHIFTING CLUTCH ACTUATORS IN AN AUTOMATIC SPEED CHANGE TRANSMISSION

BACKGROUND OF THE INVENTION

The present invention relates to automatic shifting speed change transmissions employed in motor vehicles where electrically operated solenoid valves are controlled by an electronic computer for controlling the flow of pressurized fluid to transmission shift actuators such as band clutch actuators employed in the transmission shifting operation. The electronically controlled solenoid operated valves provide improved shifting capabilities for the transmission as compared to hydro-mechanical shift controls; and, in particular, permits staged or progressive release and application of the band clutches for effecting smoother speed changes in the transmission.

Such valve assemblies are, in current production transmissions, mounted internally on the transmission valve body and supplied with pressurized fluid from a pump disposed in the transmission.

Heretofore, in controlling the shifting of an automatic speed change power transmission it has been known to use a pilot operated valve to control flow to a large flow control valve for clutch actuation such as shown in FIG. 1. FIG. 2 uses a VFS (variable force solenoid) without need of a flow control valve.

It is also known to use solenoid valves controlled by an electronic controller and to sense line pressure in order that the controller can regulate line pressure to a desired valve. An example of this latter type control is that shown and described in U.S. Pat. No. 4,781,080 which teaches a pressure sensor for providing a control signal to an electronic controller for operating a solenoid valve to regulate the supply pressure from the pump to a primary regulator valve.

Heretofore, in automatic shifting speed power transmissions for motor vehicles, with the advent of electronic control it has been desired to provide some power transmission during speed changes. Thus, the rate of engagement and disengagement of the individual clutch bands was controlled to permit speed changes prior to complete deactuation of the driving clutch. However, this required a very high degree of calibration of the solenoid operated valve controlling the pressure to the clutch actuator and has proven to be difficult to achieve reliably.

The primary technique employed in these prior art systems for shift control has been the use of an algorithm in the electronic controller utilizing a known calibration curve for the solenoid valves to yield the desired pressure output based upon the current input to the valve from the controller. However, it has been found in service that the ability to calibrate and maintain the calibration of the solenoid valves to provide sufficiently accurate control of the output pressure to the shift actuators has been limited. The pressure output of the valves has shifted with temperature variations and exposure to the transmission fluid contamination and viscosity changes.

Thus, it has long been desired to provide a way or means of providing closed loop control of solenoid operated valves for shift clutch actuator control in an automatic speed change transmission which would obviate the need for accurate flow calibration of the solenoid valves. Furthermore, it has been desired to provide such a way or means of closed loop shift control which is low in cost and easy to manufacture for a high volume motor vehicle transmission such as employed in passenger cars and light trucks.

Referring to FIG. 3, the aforesaid prior art system is shown in diagrammatic form wherein a pressure signal is provided to the transmission control unit (TCU) which controls the solenoid valve providing pump output to a line pressure regulator.

In the prior art, it is known, as for example in U.S. Pat. No. 4,776,233, to detect the torque transmitted by the clutch by disposing a pair of speed sensors on the input and output members of each speed change gear set where the speed difference between the input and output member was used as an analog of torque transmitted to provide a feedback signal to the controller for the solenoid operated valve. However, as the speed sensors must be mounted on each gear set, this has been costly and difficult particularly where planetary gear sets are employed. Thus, it has been desired to provide a simple way or means of providing closed loop control with a feedback signal indicative of the torque transmitted by a particular shifting clutch band.

BRIEF SUMMARY OF THE INVENTION

The present invention provides closed loop pressure control of hydraulically operated shift clutch actuators in an automatic speed change power transmission where the shift clutch actuators receive pressure from the outlet of an electronically controlled solenoid operated valve. The present invention is particularly applicable to automatic speed change transmissions having hydraulic actuators for operating band clutches for effecting the speed changes.

A pressure sensor detects the pressure supplied to each of the hydraulic clutch actuators such as hydraulic piston actuators for band clutches and the sensed pressure is supplied to a transmission electronic controller (TCU) which compares the pressure with a command pressure signal sent to the transmission from the vehicle powertrain electronic controller. The current to each solenoid valve may then be varied until the difference between the command pressure signal and the sensed pressure from the hydraulic clutch actuator is sufficiently near zero as to be considered negligible and indicating a match between the command signal and the actual clutch pressure. The present invention thus provides rapidly responsive shift control inasmuch as a pressure sensor may be employed with each band clutch hydraulic actuator and the full range of speed changes for the transmission may be programmed electronically to vary the speed of the clutch engagement or disengagement as desired utilizing the clutch band actuator pressure as an analog of the torque transmitted by the clutch. The present invention provides more accurate control of the engagement and disengagement of each shift clutch and this improves the ability to change speed smoothly and to maintain power transmission during speed changes.

DETAILED DESCRIPTION OF THE INVENTION

Figure 1:
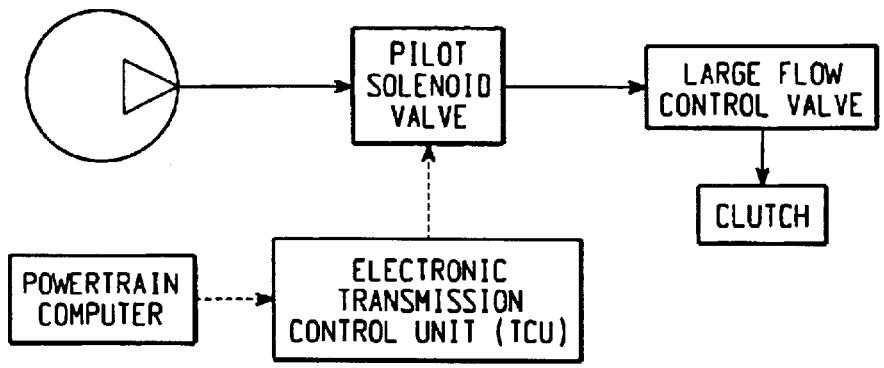
FIG. 1 is a block diagram of a prior art transmission control system.
Figure 2:
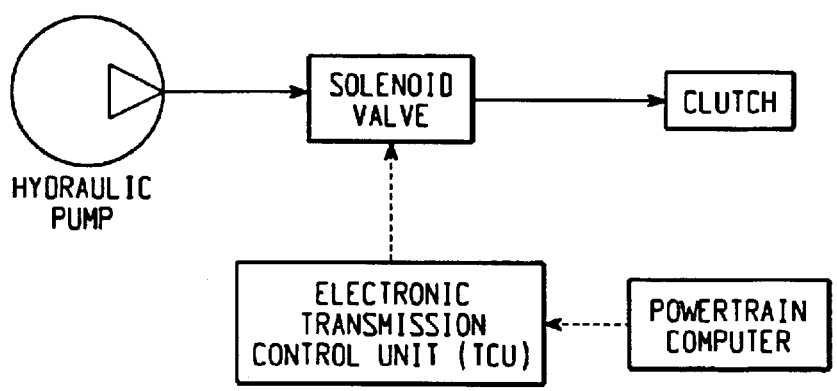
FIG. 2 is another block diagram of a prior art transmission shift control system.
Figure 3:
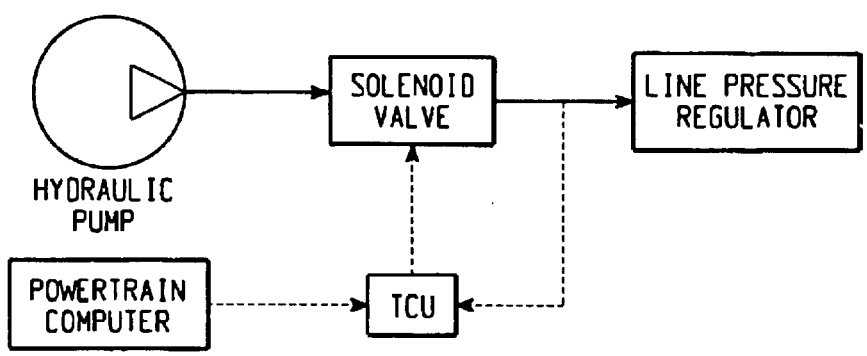
FIG. 3 is a block diagram of another prior art shift control system utilizing a pressure sensor signal to the electronic controller.
Figure 4:
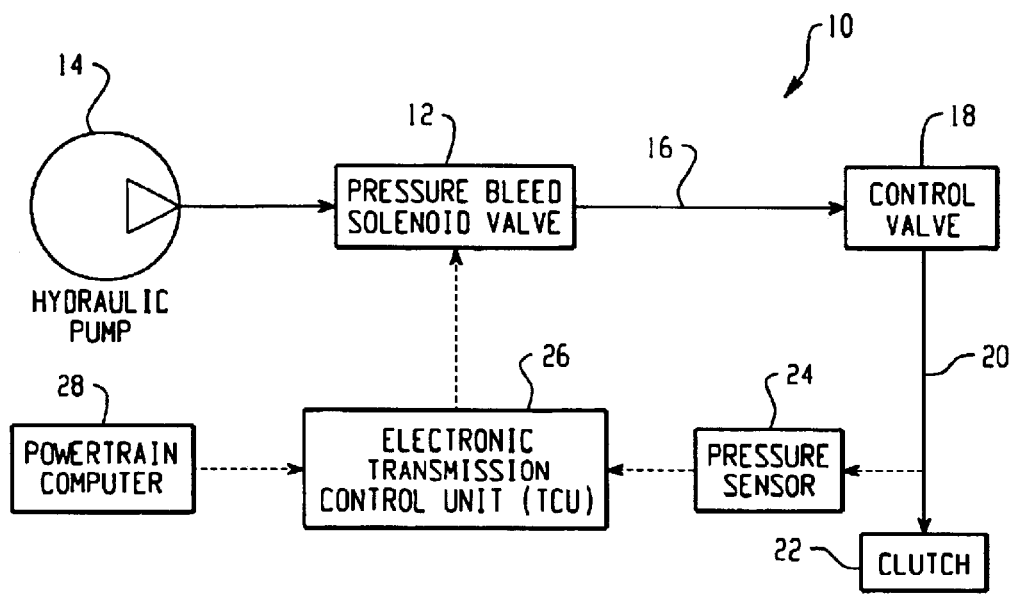
FIG. 4 is a block diagram of the control system of the present invention using a solenoid operated valve to control pressure to a clutch control valve and employing a pressure sensor.

Referring to FIG. 4, a first embodiment of the invention indicated generally at 10 is shown with a solenoid operated pressure bleed valve 12 supplied with pressurized hydraulic fluid from pump 14 which may be driven by the transmission input shaft. Valve 12 supplies pressurized fluid along conduit 16 to a hydraulic control valve 18, the output of which is applied through conduit 20 to a hydraulically actuated clutch 22, as for example, a band type clutch, for controlling torque transmission upon a speed (gear) change. The pressure supplied to the clutch along conduit 20 is sensed by a sensor 24 which provides an electrical indication of the sensed pressure, as shown by dashed line in FIG. 4, to an electronic transmission control unit (TCU) denoted by reference numeral 26 which also receives an input in the form of a command pressure signal $P_c$ from a powertrain computer 28 which is programmed to provide the desired shift characteristics for the particular vehicle and engine-transmission combination. The sensor 24 may comprise a piezoelectric sensor.

Figure 5:
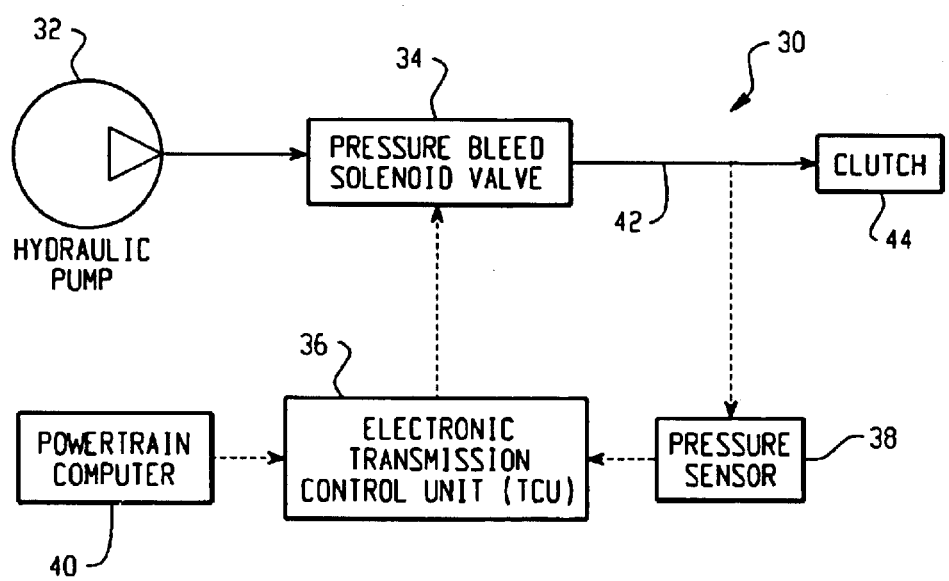
FIG. 5 is a block flow diagram of another embodiment of the present invention.

Referring to FIG. 5, another embodiment of the invention is indicated generally at 30 wherein a pump 32 provides pressurized fluid to a pressure bleed solenoid valve 34 which is operated by an electronic transmission control unit (TCU) 36 which receives an electrical signal from pressure sensor 38 and a pressure command signal from the powertrain computer 40; and, TCU 36 is operative to provide an energization current to the valve 34. The pressurized fluid at the outlet of valve 34 is supplied along conduit 42 to an hydraulically operated shift clutch 44; and, pressure sensor 38 senses the fluid pressure in conduit 42 supplying the clutch 44 and provides an electrical indication of the sensed pressure to TCU 36 as shown in dashed outline in FIG. 5.

Figure 6:
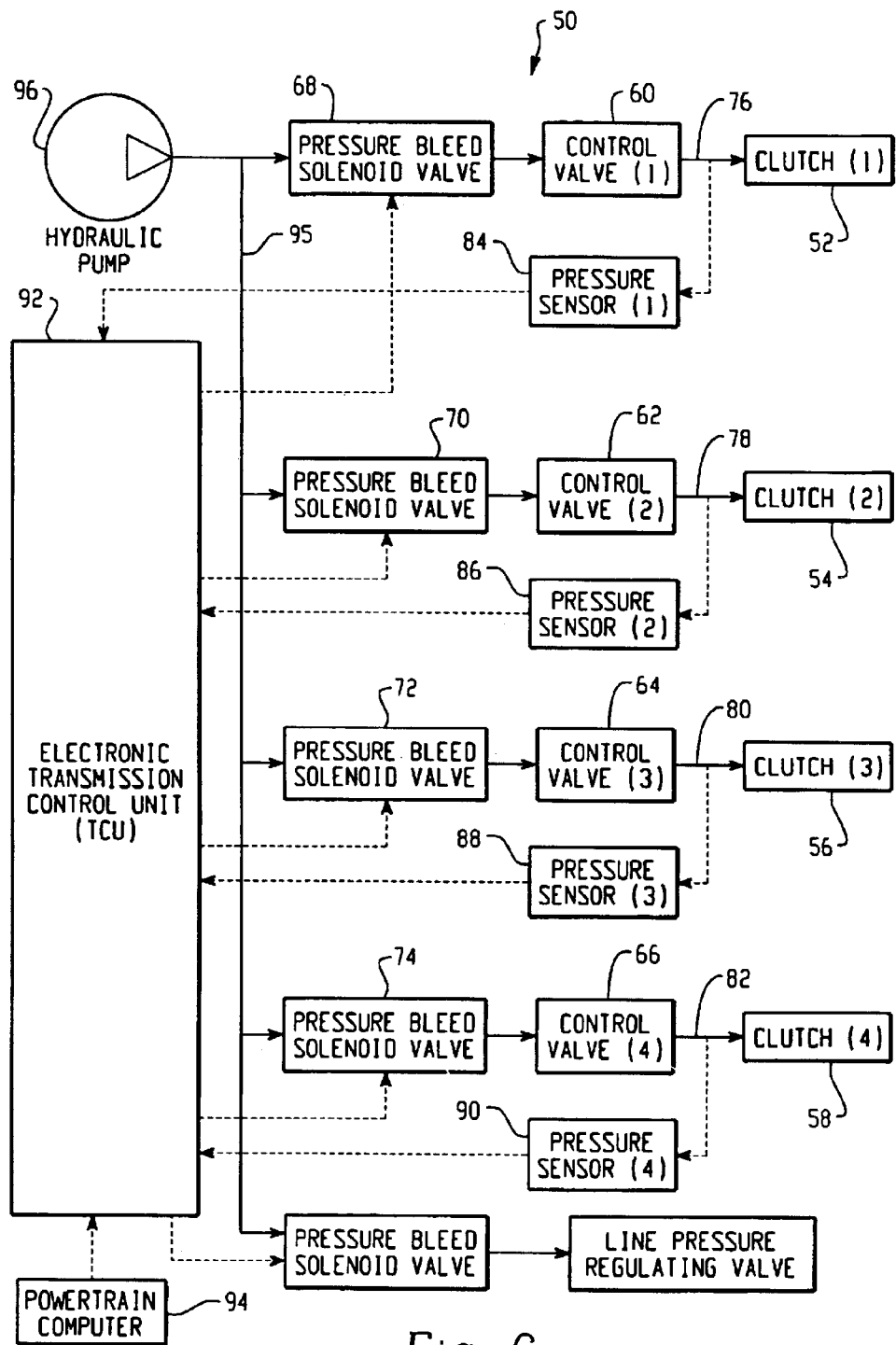
FIG. 6 is a block diagram of the present invention employing a plurality of solenoid valves and pressure switches in a transmission having a multiplicity of shift control clutches; and, FIG. 7 is a block flow diagram of controller operation of the system of the present invention.

Referring to FIG. 6, another embodiment of the invention is indicated generally at 50. The system 50 of FIG. 6 employs a plurality of clutches such as band clutches, each of which includes an hydraulic actuator and which are denoted respectively 52 through 58 in FIG. 6. Each of the clutch actuators 52 through 58 is supplied with hydraulic fluid pressure by a control valve denoted respectively 60 through 66, with each of the control valves receiving pressurized fluid from a solenoid operated valve denoted respectively 68 through 74. The clutch actuators 52 through 58 are each supplied pressurized fluid from the respective valves 60 through 66 by conduits denoted respectively 76 through 82; and, each of the conduits is tapped to provide a pressure signal to a pressure sensor denoted respectively 84 through 90.

Each of the pressure sensors 84 through 90 provides an electrical input, indicated in dashed outline in FIG. 6, to the electronic transmission control unit (TCU) denoted by reference numeral 92 which also receives a command pressure signal ($P_c$) from a powertrain computer 94 which contains the program and shift control algorithms for providing the desired operational drivability of the vehicle with a particular engine and transmission confirmation. The control algorithm may be of the type known in the art as proportional integral deviations (PID) or proportional integral. The solenoid valves 68 through 74 each receive hydraulic fluid under pressure through conduit 95 from a hydraulic pump 96 which is commonly driven by the transmission input shaft.

Figure 7:
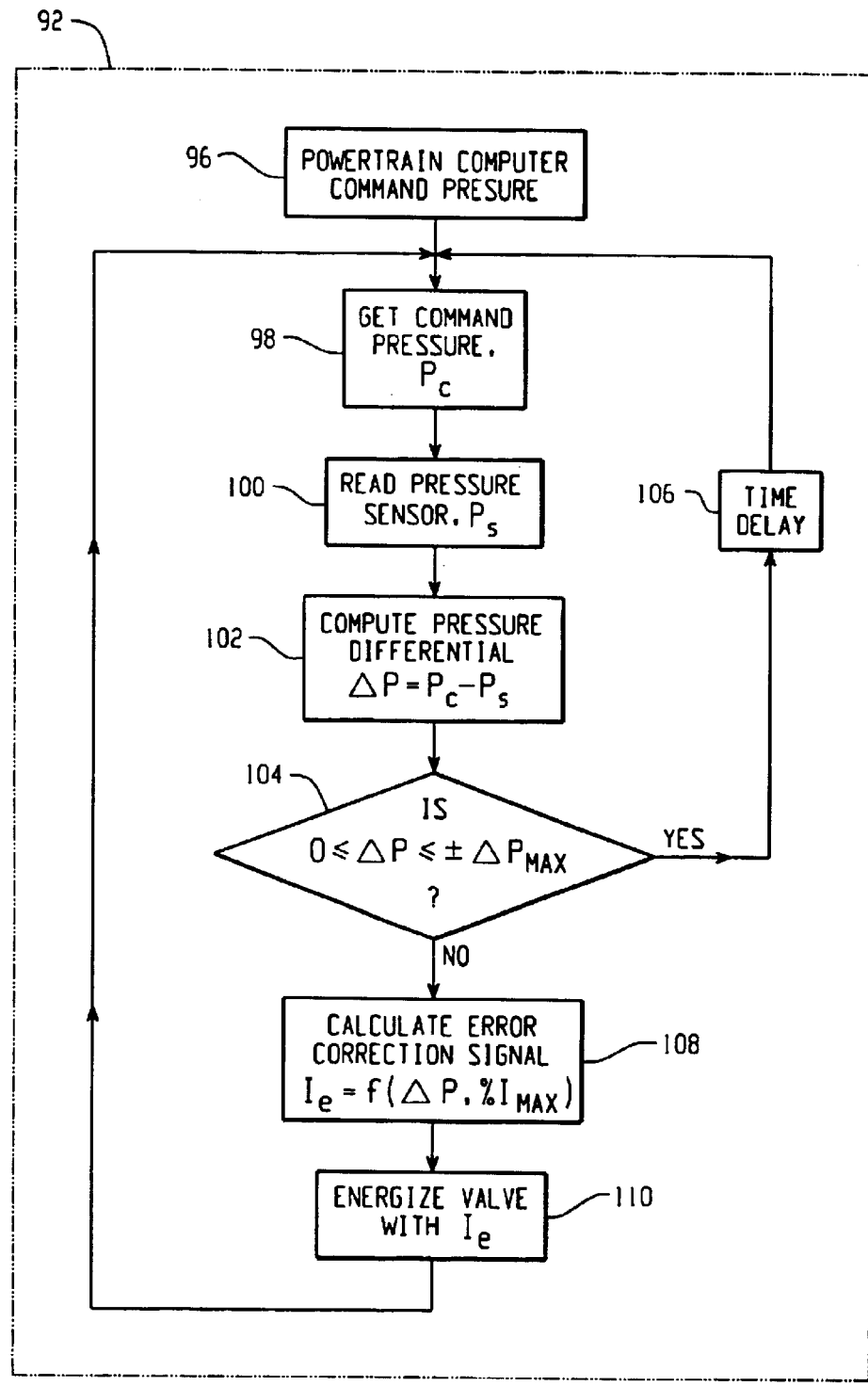

Referring to FIG. 7, the program for the software loaded into the TCU 26, 36, 92 is shown as a flow diagram wherein the pressure command signal $P_c$ is received from one of the powertrain computers 28, 40, 94 at step 96 and the system proceeds to get or store the command pressure signal $P_c$ at step 98.

The system then proceeds to read the sensors 24, 38, 84 through 90 at step 100 as the sensed pressure $P_s$. The system then proceeds to compute the pressure differential $\Delta P = P_c - P_s$ at step 102 and proceeds to ask the question at step 104 whether $\Delta P$ is less than a predetermined differential $\Delta P_{MAX}$.

If the determination at step 104 is affirmative, the pressure in the clutch actuators is deemed to be a match with the command pressure $P_c$, or in other words, the differential $\Delta P$ is sufficiently negligible as to require no further change in pressure to the clutch actuator; and, the system returns through a time delay 106 to step 98. In the present practice of the invention a time delay of about 10 milliseconds has been found to be satisfactory; however, other values of the time delay may be used depending upon the response capability of the transmission shift mechanism. In the present practice it has been found satisfactory to set the time delay greater than the response time of the shift mechanism to avoid "hunting".

If the determination in step 104 is negative and the value of $\Delta P$ exceeds the value $\Delta P_{MAX}$ deemed to be negligible then the system proceeds to step 108 and calculates the error $I_E$ from predetermined known relationships between $\Delta P$ and the percent of maximum current for energization of the valves $I_{MAX}$. In the present practice of the invention, it has been found satisfactory to set $\Delta P_{MAX}$ at about plus or minus 1 psi (6.9 kPa). The system them proceeds to step 110 to energize the respective valve with the computed current $I_e$ and returns to step 98.

The present invention thus provides a unique and simplified yet low cost technique for providing closed loop control of the shift clutch actuators in automatic speed change power transmission utilizing the sensed pressure at each clutch actuator as an analog of the torque transmitted by the clutch to provide a feedback signal to an electronic controller controlling the solenoid valves providing the pressurized hydraulic fluid to each clutch actuator. The present invention thus provides a simplified clutch torque feedback signal to the electronic controller eliminating the need for individual speed sensors on each of the power transmission speed change members.

Although the invention has hereinabove been described with respect to the illustrated embodiments, it will be understood that the invention is capable of modification and variation and is limited only by the following claims.

What is claimed is:

1. A system for controlling shifting in an automatic shifting gear change power transmission comprising:
   (a) a plurality of clutches, each operable upon actuation to effect torque transmission between a first and second rotatable member in said automatic transmission;
   (b) a plurality of hydraulically operated actuators, each operatively connected for effecting actuation and deactuation of one of said clutches;
   (c) a pump providing a source of pressurized hydraulic fluid;

(d) a plurality of electrically operated pressure control valves, each receiving at its inlet said pressurized fluid from said pump, with each of said valves connected to control hydraulic pressure to one of said actuators;

(e) an electronic controller operatively connected to provide electrical energization of each of said valves; and, (f) a plurality of pressure sensors, each disposed to sense the pressure supplied to one of said actuators by the corresponding valve and operable to provide an electrical signal indicative of said pressure to the controller, wherein actuation of each of said actuators effects a gear change in the transmission.

2. The system defined in claim 1, wherein said electrically operated pressure bleed valve includes a solenoid operator.

3. The system defined in claim 1, wherein said controller employs a proportional integral derivation (PID) algorithm of said sensor signal in energizing said valve.

4. The system defined in claim 1, wherein said controller, employs a proportional integral algorithm of said sensor signal in energizing said valve.

5. The system defined in claim 1, wherein said pressure sensor comprises a piezoelectric sensor.

6. A method of controlling shifting of an automatic multiple gear change transmission comprising:

(a) providing a power input and power output member in said transmission for each gear change in the transmission and disposing a clutch for transmitting torque between the input and output member;

(b) disposing an hydraulically operated actuator for individually activating and deactivating each clutch;

(c) disposing a pump in said transmission and connecting the outlet of the pump to the inlet of a plurality of electrically operated pressure control valves;

(d) connecting one of said valves to each of said actuators and controlling pressure thereto for effecting a gear change;

(e) disposing a plurality of pressure sensors with one of said sensors sensing the pressure supplied to each of said actuators and generating an electrical signal indicative of the sensed pressure;

(f) providing an electronic controller for said valves and connecting each of said pressure sensors thereto and providing said electrical pressure signal to said controller for each valve; and, (g) generating a control signal to each of said valves based on one of said electrical pressure signals.

7. The method defined in claim 6, wherein said step of disposing an hydraulically operated actuator includes disposing a piston actuator.

8. A method of controlling shifting in an automatic multiple gear change power transmission comprising:

(a) providing a power input and power output member in said transmission for each gear change and disposing a clutch for transmitting torque between the input and output member;

(b) disposing a fluid pressure operated actuator for individually actuating and deactivating each clutch;

(c) disposing a fluid pump and providing pressurized fluid to a plurality of electrically operated valves;

(d) connecting one of the valves to each actuator and controlling fluid pressure thereto;

(e) disposing a pressure sensor with each actuator and sensing the pressure supplied to said actuator and generating an electrical clutch pressure signal indicative of the sensed pressure;

(f) providing a shift program and generating an electrical shift pressure command signal for each gear change;

(g) comparing said clutch pressure signal (PS) with said shift pressure command signal (PC) and calculating the error ($\Delta P$) for each command signal;

(h) assigning an initial value of valve energization ($I_E$) from a known relationship of valve energization with actuator pressure and known maximum valve energization; and, (i) repeating steps (f) through (h) until the computed error is within a predetermined deviation from zero ($\Delta_{P_{MAX}}$) for each command signal.

9. The method defined in claim 8, wherein said deviation is not greater than one psi (6.9 $KP_a$).

10. A method of controlling shifting in an automatic multiple gear change power transmission comprising:

(a) providing a clutch and transmitting torque between an input and output member for each gear change;

(b) disposing a plurality of fluid pressure operated actuators and actuating and de-actuating one of said actuators for each clutch;

(c) disposing a pump and supplying pressurized fluid to each of said actuators;

(d) disposing a plurality of electrically operated valves with each of said valves controlling fluid pressure from the pump to one of the actuators;

(e) sensing the pressure supplied to the actuator and generating an electrical signal indicative of the sensed pressure;

(f) providing a shift program and generating an electrical shift pressure command signal for each gear change;

(g) comparing each clutch pressure signal and respectively each corresponding shift pressure command signal and computing the difference;

(h) varying the energization of each respective valve until said difference is negligible.

11. The method defined in claim 10, wherein said step of varying the energization of the valve includes generating a valve energization current as a known function of the percentage of the maximum valve energization current and the sensed pressure.

* * * * *